(12) United States Patent
Nose et al.

(10) Patent No.: US 8,685,601 B2
(45) Date of Patent: Apr. 1, 2014

(54) ELECTROPHOTOGRAPHIC MEMBER, METHOD FOR PRODUCING THE SAME, PROCESS CARTRIDGE AND ELECTROPHOTOGRAPHIC APPARATUS

(71) Applicant: Canon Kabushiki Kaisha, Tokyo (JP)

(72) Inventors: Keiji Nose, Machida (JP); Masaaki Harada, Yokohama (JP); Hiroaki Watanabe, Odawara (JP); Takumi Furukawa, Susono (JP); Kenya Terada, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/911,806

(22) Filed: Jun. 6, 2013

(65) Prior Publication Data

US 2014/0023960 A1 Jan. 23, 2014

Related U.S. Application Data

(63) Continuation of application No. PCT/JP2012/007800, filed on Dec. 5, 2012.

(30) Foreign Application Priority Data

Dec. 28, 2011 (JP) ................. 2011-289331

(51) Int. Cl.
*G03G 15/00* (2006.01)
*G03G 15/04* (2006.01)

(52) U.S. Cl.
USPC .................... 430/66; 430/56; 430/69

(58) Field of Classification Search
USPC ............................... 430/56, 66, 69
See application file for complete search history.

(56) References Cited

U.S. PATENT DOCUMENTS

| | | | |
|---|---|---|---|
| 5,198,685 A | 3/1993 | Kitani et al. | |
| 5,342,913 A | 8/1994 | Takago et al. | |
| 7,486,911 B2 | 2/2009 | Harada | |
| 7,615,286 B2 | 11/2009 | Kitano et al. | |
| 7,693,457 B2 | 4/2010 | Kuruma et al. | |
| 7,693,474 B2 | 4/2010 | Kitano et al. | |
| 7,962,068 B2 | 6/2011 | Kuroda et al. | |
| 8,440,307 B2 | 5/2013 | Nose et al. | |
| 8,445,113 B2 | 5/2013 | Furukawa et al. | |
| 8,481,167 B2 | 7/2013 | Watanabe et al. | |
| 8,491,994 B2 | 7/2013 | Harada et al. | |
| 8,501,312 B2 | 8/2013 | Watanabe et al. | |
| 8,532,535 B2 | 9/2013 | Nose et al. | |
| 8,538,298 B2 | 9/2013 | Harada et al. | |
| 2011/0176833 A1 | 7/2011 | Harada et al. | |
| 2012/0076539 A1 | 3/2012 | Sato et al. | |
| 2013/0272747 A1 | 10/2013 | Watanabe et al. | |
| 2013/0287444 A1 | 10/2013 | Suzuki et al. | |
| 2013/0310239 A1 | 11/2013 | Terada et al. | |

FOREIGN PATENT DOCUMENTS

| | | |
|---|---|---|
| JP | 4-202258 A | 7/1992 |
| JP | 8-20724 A | 1/1996 |
| JP | 9-160355 A | 6/1997 |
| JP | 2000-7919 A | 1/2000 |
| JP | 2005-99188 A | 4/2005 |
| JP | 2007-58197 A | 3/2007 |
| JP | 2008-176293 A | 7/2008 |
| JP | 2011-242459 A | 12/2011 |

OTHER PUBLICATIONS

Harada, et al., U.S. Appl. No. 13/843,892, filed Mar. 15, 2013.
Harada, et al., U.S. Appl. No. 13/695,781, filed Jun. 11, 2013.
International Search Report and Written Opinion of the International Searching Authority, International Application No. PCT/JP2012/007800, Mailing Date Feb. 5, 2013.

*Primary Examiner* — Stewart Fraser

(74) *Attorney, Agent, or Firm* — Fitzpatrick, Cella, Harper and Scinto

(57) ABSTRACT

An electrophotographic member including an electrically conductive substrate and an electrically conductive resin layer corresponding to a surface layer. The resin layer includes electrically conductive particles and a binder resin. The binder resin is a polymer in which a polymer chain having at least one unit selected from the group consisting of units represented by the following formulas (1) and (2) and at least one unit selected from the group consisting of units represented by the following formulas (3) and (4) is crosslinked by at least one organopolysiloxane chain selected from the group consisting of structures represented by the following formulas (5) and (6):

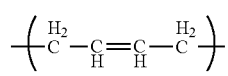

Formula (1)

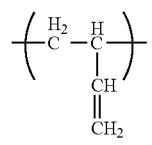

Formula (2)

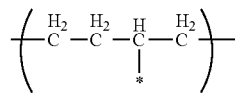

Formula (3)

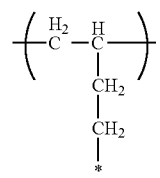

Formula (4)

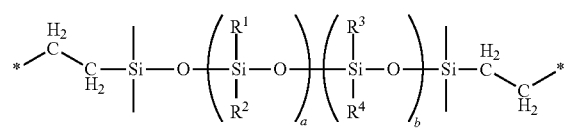

Formula (5)

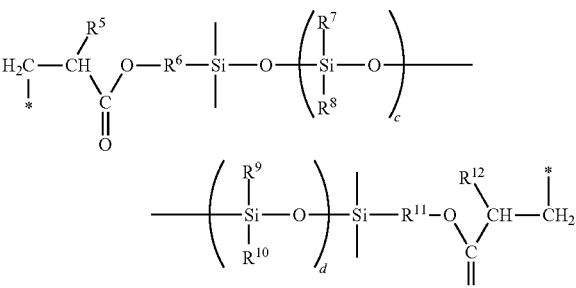

Formula (6)

6 Claims, 3 Drawing Sheets

ELECTROPHOTOGRAPHIC MEMBER, METHOD FOR PRODUCING THE SAME, PROCESS CARTRIDGE AND ELECTROPHOTOGRAPHIC APPARATUS

CROSS-REFERENCE TO RELATED APPLICATIONS

This application is a continuation of International Application No. PCT/JP2012/007800, filed Dec. 5, 2012, which claims the benefit of Japanese Patent Application No. 2011-289331, filed Dec. 28, 2011.

BACKGROUND OF THE INVENTION

1. Field of the Invention

The present invention relates to a process cartridge and an electrophotographic apparatus, and an electrophotographic member used in the process cartridge and the electrophotographic apparatus.

2. Description of the Related Art

An electrophotographic apparatus includes a charging member for uniformly charging a surface of a photosensitive, a developing member for developing an electrostatic latent image formed on the surface of the photosensitive into a toner image by supplying a toner to the latent image, and a transferring member for transferring the toner image onto a recording material. In addition, the electrophotographic apparatus includes a fixing member for fixing the toner image onto the recording material, a cleaning member for removing the toner remaining on the surface of the photosensitive after transferring the image. Among these members, as a member that is required to secure sufficient contact nip with the photosensitive in particular, a rubber roller including a semiconductive resin layer formed on a shaft of a metal cored bar and, if necessary, a surface layer formed thereon is generally used.

In recent years, cost reduction has become more and more significant as a result of intensification of price competition of products, and therefore, electrophotographic members using a thin surface layer or employing a simple layer structure including merely a resin layer and no surface layer have been proposed. Since rubber or a thermoplastic elastomer has large friction and high tackiness, however, when such a simple layer structure is employed, a toner or an external additive can adhere onto the surface of the electrophotographic member, which sometimes causes an image failure.

For overcoming such a problem, Japanese Patent Application Laid-Open No. H09-160355 discloses a charging member in which surface roughness of a resin layer is controlled by forming a surface modified layer through irradiation with an energy line such as UV or electron rays.

SUMMARY OF THE INVENTION

It has been confirmed that an electrophotographic member described in Japanese Patent Application No. H09-160355 is certainly effective against occurrence of a defect in an electrophotographic image derived from adhesion of a toner or an external additive onto the surface of the electrophotographic member. However, in consideration of improvement in process speed and further increase of image fineness in recent electrophotographic image forming apparatuses, the present inventors have recognized that it is necessary to develop an electrophotographic member capable of more definitely suppressing an electrophotographic image failure derived from the adhesion of a toner or an external additive.

Accordingly, the present invention is directed to providing an electrophotographic member capable of further suppressing adhesion of a toner or an external additive, minimally causing a defect in an electrophotographic image and having uniform conductivity.

According to one aspect of the present invention, there is provided an electrophotographic member including an electrically conductive substrate and an electrically conductive resin layer corresponding to a surface layer, wherein the resin layer includes electrically conductive particles and a binder resin, and the binder resin is a polymer in which a polymer chain having at least one unit selected from the group consisting of units represented by the following formulas (1) and (2) and at least one unit selected from the group consisting of units represented by the following formulas (3) and (4) is crosslinked by at least one organopolysiloxane chain selected from the group consisting of structures represented by the following formulas (5) and (6):

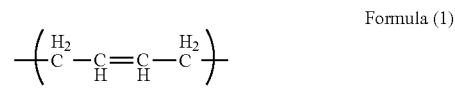

Formula (1)

Formula (2)

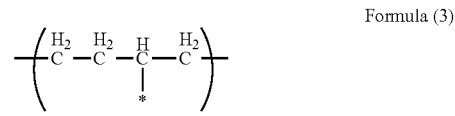

Formula (3)

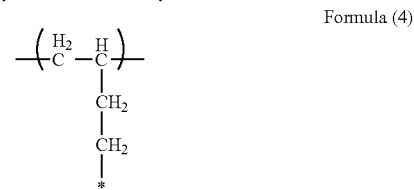

Formula (4)

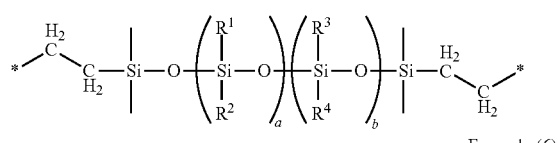

Formula (5)

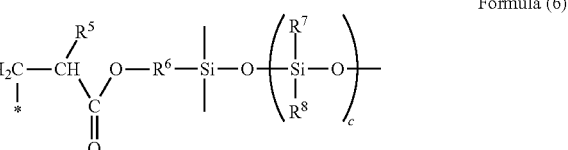

Formula (6)

In the formula (5), $R^1$ to $R^4$ each independently represent an alkyl group having a carbon number of 1 to 10, a and b each independently represent an integer of 0, or 1 or more, and a+b is an integer of 1 or more.

In the formula (6), $R^7$ to $R^{10}$ each independently represent an alkyl group having a carbon number of 1 to 10, $R^5$ and $R^{12}$ each independently represent a hydrogen atom or a methyl group, $R^6$ and $R^{11}$ each independently represent an alkylene group having a carbon number of 1 to 4, c and d each independently represent an integer of 0, or 1 or more, and c+d is an integer of 1 or more.

A sign "*" of the formula (3) and the formula (4) represents a binding site with a sign "*" of the formula (5) or the formula (6).

According to another aspect of the present invention, there is provided a process cartridge having a structure removable from a main body of an electrophotographic apparatus and including the aforementioned electrophotographic member.

According to further aspect of the present invention, there is provided an electrophotographic apparatus including the above-described electrophotographic member.

According to still further aspect of the present invention, there is provided a method for producing the above-described electrophotographic member, including:
(1) forming, on an electrically conductive substrate, a layer of a rubber composition including a polymer having a butadiene skeleton, at least one organopolysiloxane compound selected from the group consisting of compounds represented by the following formulas (7) and (8), and electrically conductive particles; and
(2) irradiating a surface of the layer of the rubber composition with an electron rays, and thereby crosslinking the rubber composition in a surface portion of the layer of a rubber composition, and forming an electrically conductive resin layer:

FIG. 2 is a schematic cross-sectional view of an electrophotographic apparatus according to the present invention.

FIG. 3 is a diagram illustrating an exemplary rough structure of an electron rays irradiation apparatus.

FIG. 4 is a schematic diagram illustrating an evaluation method for conductivity uniformity of the electrophotographic member according to the present invention.

FIG. 5 is a diagram illustrating an exemplary measurement result of universal hardness.

DESCRIPTION OF THE EMBODIMENTS

Preferred embodiments of the present invention will now be described in detail in accordance with the accompanying drawings.

<Electrophotographic Apparatus>

FIG. 2 illustrates an exemplary rough structure of an electrophotographic apparatus of the present invention. In this electrophotographic apparatus, a roller-shaped charging member (hereinafter referred to as the "charging roller") is used as an electrophotographic member. In this exemplary structure, an electrophotographic photosensitive 21 to be charged is in the shape of a drum including, as basic constitutive layers, an electrically conductive support 21b of aluminum or the like and a photosensitive layer 21a formed on the support 21b. The electrophotographic photosensitive 21 is rotatively driven around a shaft 21c at a prescribed peripheral speed in a clockwise direction in this drawing. The charging

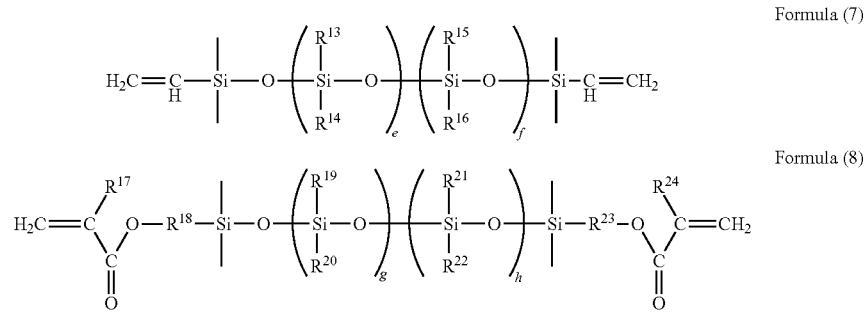

Formula (7)

Formula (8)

In the formula (7), $R^{13}$ to $R^{16}$ each independently represent an alkyl group having a carbon number of 1 to 10, e and f each independently represent an integer of 0, or 1 or more, and e+f is an integer of 1 or more.

In the formula (8), $R^{19}$ to $R^{22}$ each independently represent an alkyl group having a carbon number of 1 to 10, $R^{17}$ and $R^{24}$ each independently represent a hydrogen atom or a methyl group, $R^{19}$ and $R^{23}$ each independently represent an alkylene group having a carbon number of 1 to 4, g and h each independently represent an integer of 0, or 1 or more, and g+h is an integer of 1 or more.

The present invention provides an electrophotographic member capable of further suppressing the adhesion of a toner or an external additive and contributing to formation of a high quality electrophotographic image with a defect minimally caused therein.

Further features of the present invention will become apparent from the following description of exemplary embodiments with reference to the attached drawings.

Figure 1:
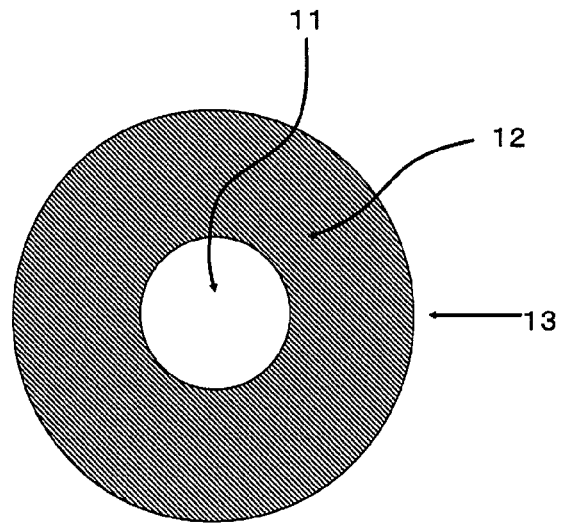
FIG. 1 is a schematic cross-sectional view of an electrophotographic member according to the present invention.

roller 1 includes a cored bar 11 and a resin layer 12 formed on the cored bar, and is disposed in contact with the electrophotographic photosensitive 21 with a pressing unit not shown working on both ends of the cored bar, so as to be driven-rotated according to the rotational drive of the electrophotographic photosensitive. A prescribed DC bias voltage is applied to the cored bar 11 by a rubbing power source 23 connected to a power source 22, so as to contact charge the electrophotographic photosensitive 21 to prescribed polarity and potential. The electrophotographic photosensitive 21 thus charged on a circumferential face thereof by the charging roller 1 is subsequently subjected to exposure (such as laser beam scanning exposure or slit exposure of an original image) for objective image information by an exposure apparatus 24, so that an electrostatic latent image corresponding to the objective image information can be formed on the circumferential face of the photosensitive. The electrostatic latent image is successively visualized as a toner image by a developing member 25. The toner image is successively transferred, by a transferring unit 26, onto a transfer material 27 that is conveyed from a paper feeding unit not shown to a transfer portion present between the electrophotographic photosensitive 21 and the transferring unit 26 at appropriate timing in synchronization with the rotation of the electrophotographic photosensitive 21. The transferring unit 26 of this exemplary structure is a transfer roller, and the toner image formed on the electrophotographic photosensitive 21 is transferred onto the transfer material 27 by conducting charging to polarity opposite to the polarity of the toner from a rear side of the transfer material 27.

The transfer material 27 having the toner image transferred onto the front face thereof is separated from the electrophotographic photosensitive 21 to be conveyed to a fixing unit not shown for fixing the toner image, and is ultimately output as an image formed material. Alternatively, if an image is to be formed also on the rear face, the transfer material is conveyed to a unit for conveying the transfer material to the transfer portion again. The circumferential face of the electrophotographic photosensitive 21 is subjected to pre-exposure by a pre-exposure unit 28 after transferring the image, so that remaining charge may be removed (eliminated) from the drum of the electrophotographic photosensitive.

As this pre-exposure unit 28, a known unit, for example, an LED chip array, a fuse lamp, a halogen lamp or a fluorescent lamp can be suitably used. The circumferential face of the electrophotographic photosensitive 21 from which the charge has been eliminated is cleaned by a cleaning member 29 so as to remove adhered contamination such as a transfer residual toner, and is repeatedly used for image formation. The charging roller 1 may be driven followingly to the electrophotographic photosensitive 21 driven through plane movement, may be non-rotative, or may be driven to positively rotate at a prescribed peripheral speed forward or backward in the plane movement direction of the electrophotographic photosensitive 21. If the electrophotographic apparatus is used as a copying machine, the exposure is conducted by scanning with laser beams, driving an LED array or driving a liquid crystal shutter array based on reflected light or transmitted light from an original or based on read signals obtained from an original.

Examples of the electrophotographic apparatus that may use the electrophotographic member of the present invention include a copying machine, a laser beam printer, an LED printer and an electrophotography application apparatus such as an electrophotographic plate making system.

The electrophotographic member of the present invention can be used not only as a charging member but also as a developing member, a transferring member, an antistatic member or a conveying member such as a paper feeding roller.

The electrophotographic member of the present invention can be used in a process cartridge having a structure removable from a main body of an electrophotographic apparatus.

<Electrophotographic Member>

Figure 2:
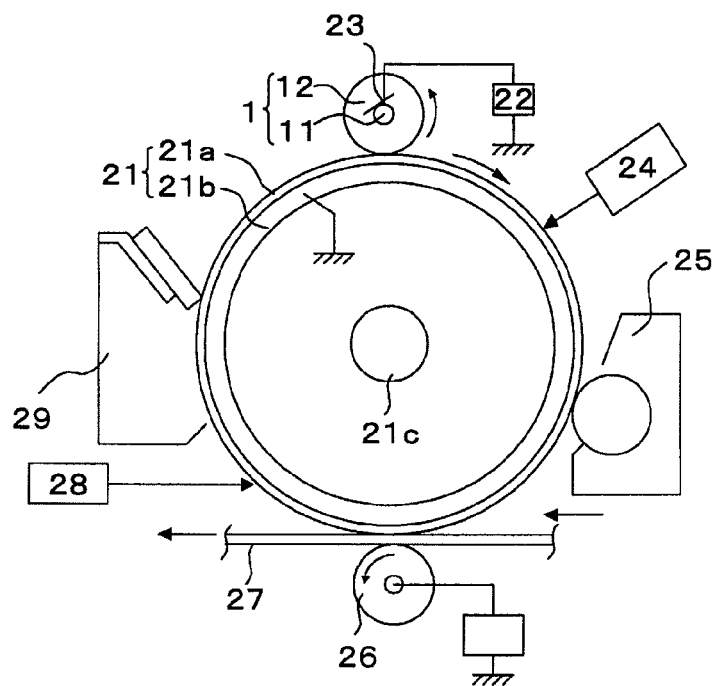

The electrophotographic member according to the present invention includes an electrically conductive substrate and an electrically conductive resin layer corresponding to a surface layer. FIG. 1 illustrates an exemplary rough structure of the electrophotographic member of the present invention. The electrophotographic member includes a cored bar 11 corresponding to the electrically conductive substrate and a resin layer 12 formed on the cored bar. The electrophotographic member of the present invention can be used as, for example, the charging roller 1 of the electrophotographic apparatus illustrated in FIG. 2.

[Resin Layer]

The resin layer is made of a semiconductive vulcanized rubber material including electrically conductive particles and a binder resin and is obtained by dispersing the electrically conductive particles in the binder resin. The binder resin may include, if necessary, a filler, a process aid, a vulcanization aid, a vulcanization accelerator, a vulcanization accelerator aid, a vulcanization retarder, a dispersant generally used as compounding ingredients of rubber.

[Electrically Conductive Particles]

Examples of the electrically conductive particles include a carbon material such as carbon black and graphite; oxides such as titanium oxide and tin oxide; metals such as Cu and Ag; and electron conductive agents such as electrically conductive particles obtained by coating particles with an oxide or a metal for attaining conductivity.

[Binder Resin]

The binder resin is a polymer in which a polymer chain including at least one unit selected from the group consisting of units represented by the formulas (1) and (2) and at least one unit selected from the group consisting of units represented by the formulas (3) and (4) is crosslinked by at least one organosiloxane chain selected from the group consisting of structures represented by the formulas (5) and (6).

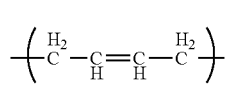

Formula (1)

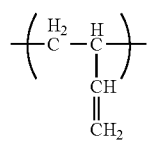

Formula (2)

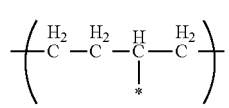

Formula (3)

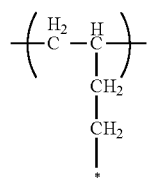

Formula (4)

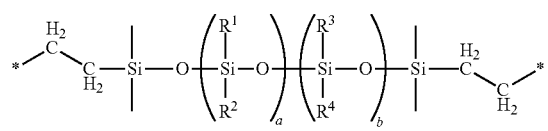

Formula (5)

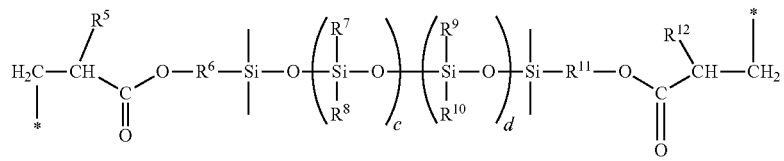

Formula (6)

In the formula (5), $R^1$ to $R^4$ each independently represent an alkyl group having a carbon number of 1 to 10, and a and b each independently represent an integer of 0, or 1 or more, and a+b is an integer of 1 or more.

In the formula (6), $R^7$ to $R^{10}$ each independently represent an alkyl group having a carbon number of 1 to 10. $R^5$ and $R^{12}$ each independently represent a hydrogen atom or a methyl group, $R^6$ and $R^{11}$ each independently represent an alkylene group having a carbon number of 1 to 4, c and d each independently represent an integer of 0, or 1 or more, and c+d is an integer of 1 or more.

A sign "*" of the formula (3) and the formula (4) represents a binding site with a sign "*" of the formula (5) or the formula (6).

As a method for preparing the binder resin of the present invention, a polymer having a butadiene skeleton is crosslinked by using a siloxane polymer represented by the formula (7) or (8).

chain of the polysiloxane makes thermal motion at large amplitude, the polymer chain thereof can easily move.

When the molecular chain of the polymer having a butadiene skeleton is crosslinked by using such molecules, the molecular motion property of the molecular chain of the polysiloxane is transmitted to the molecular chain of the polymer having a butadiene skeleton, and as a result, a contaminant component minimally comes near, and hence resistance to contamination is improved as a whole. Moreover, since the crosslinkage is caused not at one terminal but at both terminals of the polysiloxane, the molecular motion of the polysiloxane is easily transmitted through a crosslinking point to the molecular chain of the polymer having a butadiene skeleton.

According to the present invention, a crosslinked structure of sulfur crosslinking, peroxide crosslinking, metal crosslinking, amine crosslinking, oxime crosslinking, phenol resin crosslinking or the like can be present in the resin layer.

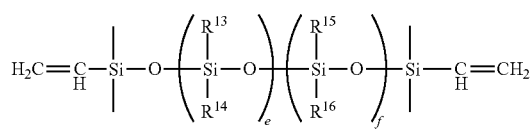

Formula (7)

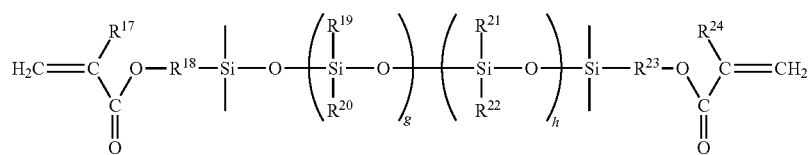

Formula (8)

In the formula (7), $R^{13}$ to $R^{16}$ each independently represent an alkyl group having a carbon number of 1 to 10, e and f each independently represent an integer of 0, or 1 or more, and e+f is an integer of 1 or more.

In the formula (8), $R^{19}$ to $R^{22}$ each independently represent an alkyl group having a carbon number of 1 to 10, $R^{17}$ and $R^{24}$ each independently represent a hydrogen atom or a methyl group, $R^{19}$ and $R^{23}$ each independently represent an alkylene group having a carbon number of 1 to 4, g and h each independently represent an integer of 0, or 1 or more, and g+h is an integer of 1 or more.

Polysiloxane used in the present invention has a structure in which a silicon atom and an oxygen atom are alternately bonded, and an alkyl group is bonded to a side chain. The silicon-oxygen bond of the polysiloxane has a length of 1.64 angstrom, which is longer than a carbon-carbon bond of a principal chain of a hydrocarbon polymer. Besides, a valence angle of silicon-oxide-silicon of the polysiloxane is larger than a valence angle of carbon-carbon-carbon of a hydrocarbon polymer, and in addition, energy for valence angle bending is extremely low. Furthermore, the polysiloxane is bulky because of the alkyl group bonded to the side chain, and has small intermolecular force. Therefore, since a molecular A polysiloxane-crosslinked structure can be present in a larger amount in a surface portion than in an inside portion of the resin layer. Furthermore, in the crosslinked structures present in the inside portion of the resin layer, the amount of a sulfur-crosslinked structure can be larger than that of the polysiloxane-crosslinked structure. Since the polysiloxane-crosslinked structure is present in a larger amount in the surface portion of the resin layer, the resin layer can show an effect to suppress adhesion of a toner or an external additive. When the amount of the polysiloxane-crosslinked structure is smaller in the inside portion of the resin layer, compression set caused though contact with a photosensitive can be reduced, so as to suppress an image failure derived from the compression set designated as a C set image. Besides, since the resin layer of the present invention uses the polymer having a butadiene skeleton with high affinity with electrically conductive particles, an electrophotographic member in which the electrically conductive particles are highly dispersed and conductivity is uniform can be obtained.

In the organopolysiloxane chain represented by the formula (5) or (6), a sum of a and b or a sum of c and d can be 80 or more and 2100 or less. When the sum of a and b or the sum of c and d is 80 or more, degradation of the molecular motion property otherwise caused because of a short molecular chain between crosslinking points can be easily prevented. Besides, when the sum of a and b or the sum of c and d is 2100 or less, the molecular motion property can be easily transmitted through a crosslinking point.

The sum of a and b or the sum of c and d can be analyzed as follows: First, 50 g of the resin layer of the electrophotographic member is collected and immersed in 500 ml of a saturated THF solution of lithium aluminum hydride for 120 hours. Thereafter, the immersed solution is filtered, 150 ml of water is slowly added to the thus obtained filtrate, and 120 ml of a 10% potassium hydroxide aqueous solution is slowly added thereto. The resultant solution is filtered out by Celite and the thus obtained filtrate is subjected to distillation under reduced pressure. The thus obtained residue solution is analyzed by $^1$H-NMR.

The $^1$H-NMR measurement conditions are as follows:
Measurement apparatus, FTNMR apparatus: "JNM-EX400" (trade name, manufactured by JEOL Ltd.)
Measurement frequency: 400 MHz
Pulse condition: 5.0 μS
Data point: 32768
Frequency range: 10500 Hz
Number of integrations: 16 times
Measurement temperature: room temperature Measurement sample: A measurement sample is prepared by putting 50 mg of a sample in a sample tube with a diameter of 5 mm and adding $CDCl_3$ (deuterated chloroform; including 0.05 mass % of TMS (tetramethylsilane)) thereto as a solvent.

In a spectrum obtained through this analysis, the sum of c and d can be obtained based on a ratio between a peak area in the vicinity of 4.1 ppm and a peak area of 0.1 ppm. The sum of a and b can be obtained based on a ratio between a peak area in the vicinity of 1.1 ppm and a peak area of 0.1 ppm.

The structures represented by the formula (1) and the formula (2) and included in the binder resin can be identified through microscopic ATR (attenuated total reflection absorption spectroscopy) analysis. In an ATR spectrum, such a structure can be recognized based on a peak in the vicinity of 1420 $cm^{-1}$ derived from C—H out-of-plane bending vibration.

An example of a crosslinking method for crosslinking a polymer molecular chain having a butadiene skeleton with a polysiloxane molecular chain includes the following: Polysiloxane represented by the formula (7) or the formula (8) is precedently mixed with a polymer having a butadiene skeleton, and thereafter, the thus obtained mixture is reacted thermally or by using UV or electron rays. The crosslinking reaction is caused between a vinyl group represented by the formula (7) or a (meth)acryloxy group represented by the formula (8) and a double bond portion of a structure represented by the formula (1) or the formula (2). If the crosslinkage is caused by using polysiloxane represented by the formula (7), the structures represented by the formula (3), the formula (4) and the formula (5) are produced, and if the crosslinkage is caused by using polysiloxane represented by the formula (8), the structures represented by the formula (3), the formula (4) and the formula (6) are produced. Incidentally, since a structure represented by the formula (5) is produced from a raw material represented by the formula (7), $R^{13}$ to $R^{16}$ of the formula (7) are respectively the same substituents as $R^1$ to $R^4$ of the formula (5) and e+f=a+b. Similarly, $R^{17}$ to $R^{24}$ of the formula (8) are respectively the same substituents as $R^5$ to $R^{12}$ of the formula (5) and c+d=g+h. The crosslinking reaction is conducted preferably through irradiation with electron rays because such a reaction shows high reactivity and the crosslinking reaction can be proceeded down to a deeper portion along a depth direction of the resin layer in such a method than in a method employing UV. Besides, when electron rays are used, the amount of the polysiloxane-crosslinked structure present in the surface portion of the resin layer can be made larger than in the inside portion of the resin layer. In the binder resin produced in this manner, the structures represented by the formula (1) and the formula (2) originally included in the polymer having a butadiene skeleton remain without being crosslinked.

The polysiloxane represented by the formula (7) or the formula (8) can be obtained by mixing cyclic siloxane and functional group-containing disiloxane and polymerizing the thus obtained mixture with a catalyst such as trifluoromethane sulfonic acid, ammonium silanolate or potassium silanolate added.

Examples of the cyclic siloxane include octamethylcyclotetrasiloxane, hexamethylcyclotrisiloxane and hexadecylcyclotrisiloxane. Examples of the functional group-containing disiloxane include 1,3-divinyltetramethyldisiloxane, 1,3-bis(3-methacryloxypropyl) tetramethyldisiloxane and 1,3-bis(3-methacryloxybutyl) tetramethyldisiloxane.

An example of the polymer having a butadiene skeleton includes a polymer having at least one unit selected from the group consisting of the units represented by the formula (1) and the formula (2). Specific examples of the polymer having a butadiene skeleton include butadiene rubber (BR), crystalline syndiotactic polybutadiene-containing butadiene rubber (VCR), styrene-butadiene rubber (SBR), acrylonitrile-butadiene copolymer (NBR), polybutadiene thermoplastic elastomers, styrene-butadiene thermoplastic elastomers (SBS), acrylonitrile-butadiene-styrene copolymer (ABS) and epoxidized polybutadiene. Besides, a blend of two or more of these polymers having a butadiene skeleton may be used.

The electrophotographic member of the present invention can be produced, for example, through the following two steps (1) and (2): Step (1) of forming, on an electrically conductive substrate, a layer of a rubber composition including a polymer having a butadiene skeleton, at least one organopolysiloxane compound selected from the group consisting of compounds represented by the formula (7) and the formula (8) and electrically conductive particles; and step (2) of forming an electrically conductive resin layer by causing crosslinkage in the rubber composition on a surface of and in a portion near the surface of the layer through irradiation of the surface of the layer of the rubber composition with electron rays.

Figure 3:
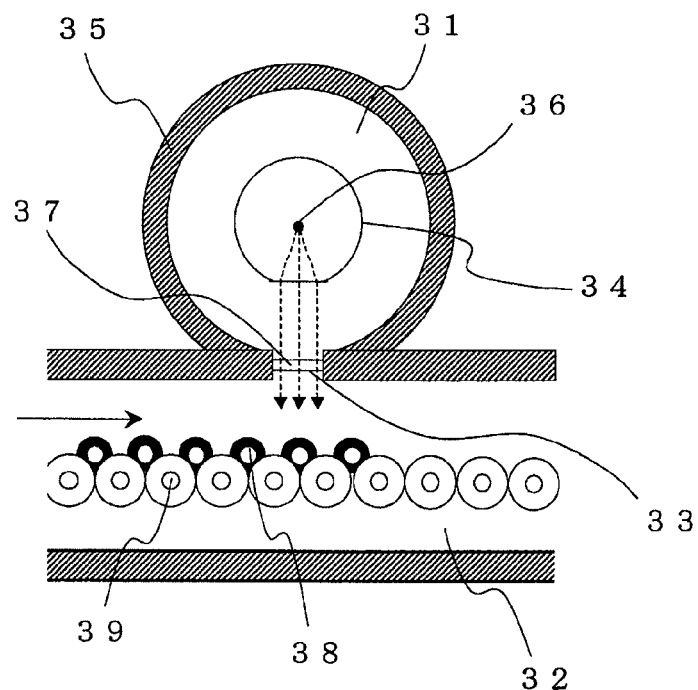

FIG. 3 is a schematic diagram of an electron rays irradiation apparatus. The electron rays irradiation apparatus usable in the present invention irradiates, with electron rays, a roller surface while rotating the rubber roller having been ground, and includes an electron rays generating part 31, an irradiation chamber 32 and an irradiation port 33. The electron rays generating part 31 includes a terminal 34 for generating electron rays and an accelerating tube 35 for accelerating the electron rays generated by the terminal 34 within a vacuum space (an acceleration space). Furthermore, the inside of the electron rays generating part is kept in a vacuum of $10^{-3}$ Pa or more and $10^{-6}$ Pa or less by a vacuum pump or the like not shown for avoiding energy loss caused through collision of electrons against gas molecules. When a current is supplied to a filament 36 from a power source not shown for heating, the filament 36 radiates thermoelectrons, and merely thermoelectrons passing through the terminal 34 among these thermoelectrons are effectively taken out as electron rays. The electron rays are accelerated in the acceleration space within the accelerating tube 35 by an acceleration voltage for the electron rays, and the accelerated electron rays break through an irradiation port foil 37, so as to irradiate a rubber roller 38 having been ground and conveyed within the irradiation chamber 32 disposed below the irradiation port 33. If the ground rubber roller 38 is irradiated with the electron rays, the atmosphere inside the irradiation chamber 32 can be a nitrogen atmosphere. Furthermore, the ground rubber roller 38 is rotated by a roller rotating member 39 so as to be moved by a conveying unit in the irradiation chamber from left to right in FIG. 3. Incidentally, a lead shield not shown is provided around the electron rays generating part and the irradiation chamber 32 so that X-rays secondarily generated during the electron rays irradiation cannot be externally leaked.

The irradiation port foil 37 is made of a metal foil, and works to divide the vacuum atmosphere within the electron rays generating part and the air atmosphere within the irradiation chamber and to take the electron rays out to the irradiation chamber through the irradiation port foil 37. As described above, if the electron rays are used for the irradiation of the roller, the atmosphere within the irradiation chamber 32 where the roller is irradiated with the electron rays can be a nitrogen atmosphere. Therefore, the irradiation port foil 37 provided on the boundary between the electron rays generating part 31 and the irradiation chamber 32 preferably has no pin hole, has mechanical strength for sufficiently keeping the vacuum atmosphere within the electron rays generating part and is liable to transmit the electron rays. For this purpose, the irradiation port foil 37 can be made of a metal having small specific gravity and a small thickness and is generally made of an aluminum or titanium foil. The conditions for the crosslinking treatment performed by using the electron rays are determined depending upon the acceleration voltage and radiation dose of the electron rays. The acceleration voltage affects the depth of the crosslinking treatment, and as the condition of the acceleration voltage employed in the present invention, the acceleration voltage can be in a low energy region of 40 kV or more and 300 kV or less. When the acceleration voltage is 40 kV or more, a crosslinking reaction sufficient for achieving the effects of the present invention can be easily attained. Furthermore, when the acceleration voltage is 300 kV or less, the electron rays irradiation apparatus can be prevented from increasing in the size so as to prevent increase of apparatus cost. As a more preferable condition, the acceleration voltage can be 80 kV or more and 150 kV or less.

The radiation dose of the electron rays employed in the electron rays irradiation is defined according to the following equation (1):

$$D=(K\cdot I)/V \quad (1)$$

wherein D represents a radiation dose (kGy), K represents an apparatus constant, I represents an electron current (mA), and V represents a treatment speed (m/min). The apparatus constant K is a constant corresponding to efficiency of an individual apparatus and is an index of performance of the apparatus. The apparatus constant K can be obtained by measuring radiation doses under a prescribed acceleration voltage condition with the electron current and the treatment speed varied. The radiation dose of the electron rays can be measured by adhering a dose measuring film onto a surface of a roller, actually treating the resultant roller with the electron rays irradiation apparatus, and measuring the radiation dose of the film with a film dosimeter. At this point, a dose measuring film available under a trade name of FWT-60 and a film dosimeter available under a trade name of FWT-92D (both manufactured by Far West Technology, Inc.) can be used.

Incidentally, a crosslinked region may be formed on the whole surface of the resin layer, and if the charging member of the present invention is, for example, a charging roller, the crosslinked region can be formed over the whole outer circumferential face of the resin layer. A universal hardness tester can be used for confirming that the resin layer of the charging member has a region crosslinked through the irradiation with the electron rays. Universal hardness is a physical property value obtained by thrusting an indenting tool into a measurement target under load, and is obtained according to an expression of [test load]/[surface area of indenting tool under test load] (N/mm$^2$). The universal hardness can be measured by using, for example, a hardness measuring apparatus such as an ultra-micro hardness tester H-100V (trade name) manufactured by Fischer. In employing this measuring apparatus, an indenting tool in, for example, a quadrangular pyramid shape is thrust into a measurement target under prescribed comparatively small test load, and when a prescribed indentation depth is attained, a surface area of the indenting tool in contact with the measurement target is obtained based on the indentation depth, so that the universal hardness may be obtained according to the aforementioned expression. Specifically, stress, caused with the indenting tool thrust into the measurement target under constant load condition, against the indentation depth is defined as the universal hardness.

Figure 5:
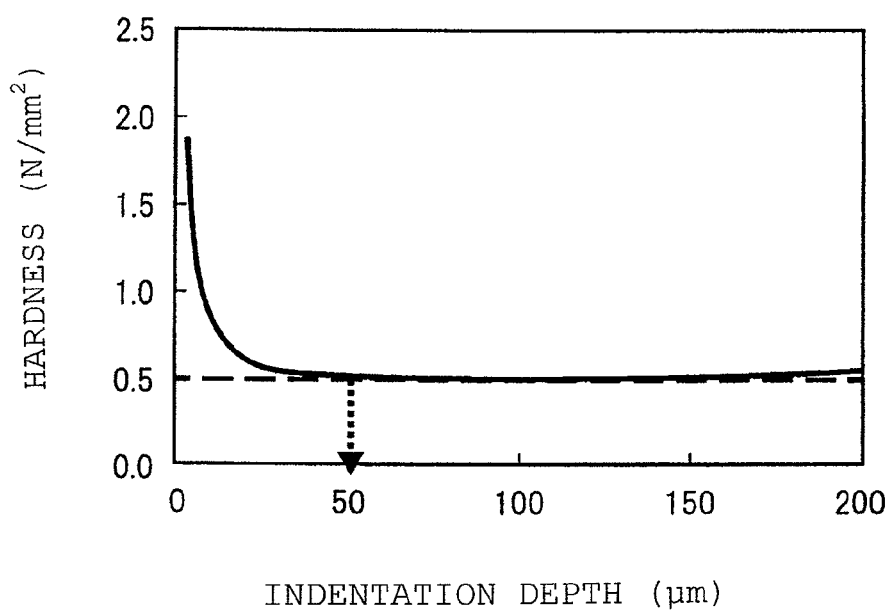

FIG. 5 illustrates an exemplary measurement result of the universal hardness. In a graph of FIG. 5, the abscissa indicates the indentation depth (μm) and the ordinate indicates the hardness (N/mm$^2$). Based on FIG. 5, an abscissa value corresponding to a starting point of a shift between a measurement curve and a straight line extrapolated from a measurement region corresponding to abscissa values of 150 μm or more and 200 μm or less, that is, a linear region where the hardness is minimally changed against the indentation depth, can be defined as a crosslinking treatment depth. It is noted that a cured layer has a thickness of 50 μm in the exemplary measurement result of FIG. 5.

In this manner, the treatment with the electron rays is characterized in that a crosslinked layer with a depth from a roller surface of 10 μm or more can be formed in a single resin layer. In other words, when a charging roller having been irradiated with electron rays is measured with the universal hardness tester, it is generally found that the charging roller is soft inside but has a layer with hardness gradient formed merely in the vicinity of the surface thereof as illustrated in FIG. 5.

EXAMPLES

The present invention will now be described in more detail by giving examples. As reagents and the like, commercially available high purity products were used unless otherwise mentioned.

Incidentally, in each of the examples, if organopolysiloxane represented by the formula (7) is used in preparing an unvulcanized rubber composition, a resulting binder resin includes structures represented by the formula (1), the formula (2), the formula (3), the formula (4) and the formula (5). Alternatively, if organopolysiloxane represented by the formula (8) is used in preparing an unvulcanized rubber composition, a resulting binder resin includes structures represented by the formula (1), the formula (2), the formula (3), the formula (4) and the formula (6). These structures can be analyzed through the $^1$H-NMR and the microscopic ATR by the aforementioned methods.

First, Synthesis Examples 1 to 7 for organopolysiloxane used as a raw material will be described.

Synthesis Example 1

A mixture of 54 mg of 1,3-divinyltetramethyldisiloxane (manufactured by Aldrich), 200 g of hexadecylcyclotrisiloxane and 1 g of trifluoromethane sulfonic acid (manufactured by Aldrich) was prepared, and the mixture was reacted at 80° C. to 90° C. for 96 hours. Thereafter, 2 g of triethylamine (manufactured by Aldrich) was added thereto, the resultant mixture was stirred for 20 hours, and the mixture was stripped and filtered under conditions of 110° C. and 4 mmHg. The thus obtained colorless liquid was identified through the H-NMR, resulting in finding that the liquid included a structure represented by the formula (7) in which e+f=2100 and $R^{13}$ to $R^{16}$ were $C_{10}H_{21}$—. Organopolysiloxane thus obtained is designated as "PSiO-1".

Synthesis Example 2

A mixture of 350 mg of 3-bis(3-methacryloxypropyl) tetramethyldisiloxane (manufactured by Gelest, Inc.), 200 g of hexamethylcyclotrisiloxane and 1 g of trifluoromethane sulfonic acid (manufactured by Aldrich) was prepared, and the mixture was reacted at 80° C. to 90° C. for 96 hours. Thereafter, 2 g of triethylamine (manufactured by Aldrich) was added thereto, the resultant mixture was stirred for 20 hours, and the mixture was stripped and filtered under conditions of 110° C. and 4 mmHg. The thus obtained colorless liquid was identified through the H-NMR, resulting in finding that the liquid included a structure represented by the formula (8) in which g+h=2100, $R^{19}$ to $R^{22}$ were $CH_3$—, $R^{17}$ and $R^{24}$ were $CH_3$—, and $R^{12}$ and $R^{23}$ were —$CH_2$—. Organopolysiloxane thus obtained is designated as "PSiO-2".

Synthesis Examples 3 to 7

Five organopolysiloxanes "PSiO-3" to "PSiO-7" were prepared in the same manner as in Synthesis Example 2.

[In examples described below, the organopolysiloxanes obtained in the aforementioned synthesis examples and commercially available organopolysiloxanes were used, and the chemical structures, structures of substituents and values of [e+f] or [g+h] of these organopolysiloxanes are shown in Table 1 below.

name: TD6-15MDX, manufactured by Toshin Co., Ltd.) at a filling ratio of 70 vol % and a blade speed of 30 rpm for 16 minutes, so as to obtain a "first-stage kneaded rubber composition".

Subsequently, two materials of a component (2) shown in Table 2 were mixed with the first-stage kneaded rubber composition with open rolls each having a diameter of 12 inches (0.30 m). At this point, the resulting mixture was bilaterally cut twenty times in total at a front roll speed of 8 rpm and a back roll speed of 10 rpm and at a roll distance of 2 mm. Thereafter, the resultant was subjected to tight milling ten times with the roll distance set to 0.5 mm, so as to obtain "unvulcanized rubber composition 1" for a resin layer.

TABLE 2

| | Material | parts by mass |
|---|---|---|
| Component (1) | NBR as raw rubber (trade name: Nipol DN219, manufactured by Zeon Corporation) | 100 |
| | Zinc stearate | 1 |
| | Zinc oxide | 5 |
| | Calcium carbonate (trade name: Super #2000, manufactured by Maruo Calcium Co., Ltd.) | 20 |
| | Carbon black (trade name: Tokablack #7350, manufactured by Tokai Carbon Co., Ltd.) | 50 |
| | Polysiloxane represented by formula (7) (trade name: DMS-V05, manufactured by Gelest, Inc., in which e + f = 9 and R13 to R16 = CH3-) | 0.3 |
| Component (2) | Sulfur | 1.2 |
| | Tetrabenzylthiuram disulfide (trade name: Perkacit-TBzTD (abbreviated as TBzTD), manufactured by Flexsys K.K.) | 4.5 |

2. Formation of Vulcanized Rubber Layer

A conductive vulcanization adhesive (trade name: Metaloc U-20; manufactured by Toyo Kagaku Kenkyusho Co., Ltd.) was applied to an axially center portion with a length of 226

TABLE 1

| Organopolysiloxane | Structure | $R^{13}$-$R^{16}$ | $R^{19}$-$R^{22}$ | $R^{17}$, $R^{24}$ | $R^{18}$, $R^{23}$ | e + f | g + h |
|---|---|---|---|---|---|---|---|
| DMS-V05 manufactured by Gelest, Inc. | Formula (7) | $CH_3$— | | | | 9 | |
| DMS-V21 manufactured by Gelest, Inc. | Formula (7) | $CH_3$— | | | | 80 | |
| DMS-V35 manufactured by Gelest, Inc. | Formula (7) | $CH_3$— | | | | 770 | |
| DMS-V52 manufactured by Gelest, Inc. | Formula (7) | $CH_3$— | | | | 2100 | |
| PSiO-1 | Formula (7) | $C_{10}H_{21}$— | | | | 2100 | |
| PSiO-2 | Formula (8) | | $CH_3$— | $CH_3$— | —$CH_2$— | | 2100 |
| PSiO-3 | Formula (8) | | $CH_3$— | $CH_3$— | —$C_3H_6$— | | 2100 |
| PSiO-4 | Formula (8) | | $CH_3$— | $CH_3$— | —$C_4H_8$— | | 2100 |
| PSiO-5 | Formula (8) | | $CH_3$— | H— | —$C_3H_6$— | | 2100 |
| PSiO-6 | Formula (8) | | $C_{10}H_{21}$— | $CH_3$— | —$C_3H_6$— | | 2100 |
| PSiO-7 | Formula (8) | | $C_{10}H_{21}$— | H— | —$C_3H_6$— | | 2100 |

*DMS-T63 manufactured by Gelest, Inc.: polydimethylsiloxane

Example 1

1. Preparation of Unvulcanized Rubber Composition

Six materials of a component (1) shown in Table 2 below were mixed by using a 6-liter pressure kneader (product mm of a cylindrical face of a cylindrical conductive cored bar (of steel having a nickel-plated surface) with a diameter of 6 mm and a length of 252 mm, and the resultant was dried at 80° C. for 30 minutes. Next, the aforementioned unvulcanized rubber composition provided coaxially around the cored bar was simultaneously extruded into a cylindrical shape by using an extruder equipped with a crosshead, so as to prepare an unvulcanized rubber roller with a diameter of 8.8 mm including the cored bar coated with the unvulcanized rubber composition. The extruder used for the extrusion had a cylinder diameter of 45 mm (φ45) and L/D of 20, and the temperature of a head was set to 90° C., the temperature of a cylinder was set to 90° C. and the temperature of a screw was set to 90° C. at the time of extrusion. Both ends of the thus obtained layer of the unvulcanized rubber composition of the unvulcanized rubber roller were cut off, so that the layer of the unvulcanized rubber composition might have a width of 228 mm along the axial direction. Thereafter, the unvulcanized rubber roller was heated at 160° C. for 40 minutes with an electric furnace, so as to change the layer of the unvulcanized rubber composition into a vulcanized rubber layer.

Subsequently, the surface of the vulcanized rubber layer was ground with a plunge-cut grinding machine, so as to obtain "vulcanized rubber roller 1" including a crown-shaped vulcanized rubber layer and having a diameter of 8.35 mm at each end and a diameter of 8.50 mm at the center.

3. Crosslinkage of Polymer Having Butadiene Skeleton and Polyorganosiloxane Chain The surface of vulcanized rubber roller 1 was irradiated with electron rays for causing crosslinkage in a rubber component in a surface portion thereof, so as to obtain "electrophotographic member 1". The irradiation with electron rays was performed by using an electron rays irradiation apparatus (manufactured by Iwasaki Electric Co., Ltd.) with a maximum acceleration voltage of 150 kV and a maximum electron current of 40 mA, and nitrogen gas purging was conducted at the time of irradiation. This treatment was conducted under conditions of an acceleration voltage of 150 kV, an electron current of 35 mA, a treatment speed of 1 m/min, and an oxygen concentration of 100 ppm. At this point, an apparatus constant attained at the acceleration voltage of 150 kV of the electron rays irradiation apparatus was 37.8, and a radiation dose calculated according to the equation (1) was 1323 kGy.

4. Evaluation of Charge Uniformity and Evaluation of Image Formation

The thus prepared electrophotographic member was incorporated into an electrophotographic process cartridge as a charging roller, and this process cartridge was incorporated into an electrophotographic apparatus (LBP5050 manufactured by Canon Inc.) for vertically outputting A-4 size paper. Thus, evaluation for charge uniformity and evaluation for an image failure derived from adhesion of a toner or an external additive were carried out.

The evaluation for charge uniformity was conducted based on an image formed before endurance (before printing), and the charge uniformity was ranked based on the following criteria:
A: A halftone image is uniform and free from charge unevenness.
B: A halftone image has recognizable density unevenness or slightly has a vertical stripe image failure derived from contamination of the charging roller.

As a result of the evaluation, the charge uniformity was ranked A.

The evaluation for an image failure derived from the adhesion of a toner or an external additive was performed under an environment of a temperature of 15° C. and relative humidity of 10% based on a halftone image output after making 6000 prints at a printing density of 1%. It is noted that a halftone image means an image in which lines each with a width of 1 dot are drawn at intervals of 2 dots along a direction vertical to the rotation direction of an electrophotographic photosensitive.

The evaluation was conducted based on the following criteria, and a rank of C or higher was defined as a practically allowable level.
A: Density unevenness is minimally recognized.
B: Density unevenness is extremely slightly caused.
C: Density unevenness is slightly caused.
D: Density unevenness is clearly caused.

As a result of the evaluation, the image formation was ranked A. For evaluating further durability, the charging roller having been used for making 6000 prints was taken out of the process cartridge and was incorporated into a new process cartridge for making another 6000 prints, and an image obtained after making 12000 prints in total was evaluated. As a result of the evaluation performed after making 12000 prints, the image formation was ranked B.

5. Evaluation of Conductivity Uniformity

Figure 4:
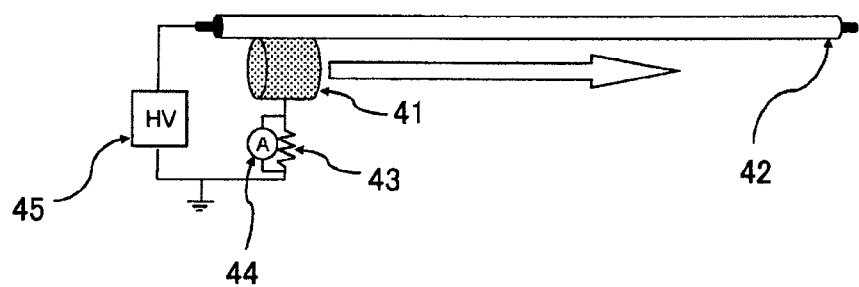

A resistance measuring apparatus illustrated in FIG. 4 includes a stainless steel cylinder 41 with a width of 10 mm and an aperture of 24 mm on which an electrophotographic member 42 to be measured is placed; and a loading device not shown for fixing both ends of an electrically conductive support of the electrophotographic member and abutting the cylinder against the electrophotographic member. The resistance measuring apparatus further includes a bias applying power source 45 for applying a bias voltage to the electrically conductive support of the electrophotographic member; a fixed resistor (1 kΩ) 43 connected to a surface of the cylinder; and an ammeter 44 for measuring a current of the fixed resistor.

In this resistance measuring apparatus, the electrophotographic member was rotated at a rotational speed of 5 rpm so as to make the cylinder 41 followingly rotate, and an applied voltage of −200 V was supplied from the bias applying power source. Measured values of the ammeter were sampled at intervals of 100 Hz for obtaining a measurement waveform. After this operation, a similar operation was conducted with the cylinder 41 shifted by 10 mm in an arrow direction of FIG. 4. Such an operation is repeated for conducting the measurement over the whole surface of the electrophotographic member. Conductivity uniformity was evaluated based on a value ($R_1/R_2$) obtained by dividing a maximum value $R_1$ by a minimum value $R_2$ of all the measurement waveforms thus obtained. When the value was 4 or less, the conductivity uniformity was evaluated to be practically allowable. Incidentally, this test was performed in an environment of a temperature of 23° C. and relative humidity of 50%. As a result of the evaluation, the value ($R_1/R_2$) of the conductivity uniformity was 1.6.

6. Measurement of Crosslinking Treatment Depth

A curing thickness was obtained by measuring surface hardness of the charging roller with a universal hardness tester. The measurement was conducted by using an ultra-micro hardness tester H-100V (trade name) manufactured by Fischer, and diamond in the shape of a quadrangular pyramid was used as an indenting tool. An indentation speed was set according to the following equation (2).

$$dF/dt = 1000 \text{ mN}/240 \text{ s} \tag{2}$$

wherein F represents force and t represents time.

As illustrated in FIG. 5, an abscissa value corresponding to a starting point of a shift between a measurement curve and a straight line extrapolated from a measurement region corresponding to abscissa values of 150 µm or more and 200 µm or less where the hardness is minimally changed against the indentation depth was obtained as a thickness of a cured layer, resulting in finding that a crosslinking treatment depth was 90 µm.

Examples 2 to 6

Electrophotographic members 2 to 6 were prepared in the same manner as in Example 1 except that the type of raw rubber used in the preparation of the unvulcanized rubber composition was changed to NBR (trade name: Nipol DN219, manufactured by Zeon Corporation) or BR (trade name: BR-1220L, manufactured by Zeon Corporation) and that the content of the polysiloxane of the formula (7) was changed to a content shown in Table 3(i.e., 0.3 or 5.0 parts by mass). The evaluation of the charge uniformity, the evaluation of the image formation, the evaluation of the conductivity uniformity and the measurement of the crosslinking treatment depth were conducted in the same manner as in Example 1.

Examples 7 to 11

Electrophotographic members 7 to 11 were prepared in the same manner as in Example 1 except that the type and the content of polysiloxane of the formula (7) employed in the preparation of the unvulcanized rubber composition were changed to those shown in Table 3 (i.e., 0.3 or 5.0 parts by mass of DMS-V21 or DMS-V52). The evaluation of the charge uniformity, the evaluation of the image formation, the evaluation of the conductivity uniformity and the measurement of the crosslinking treatment depth were conducted in the same manner as in Example 1.

Examples 12 to 17

Electrophotographic members 12 to 17 were prepared in the same manner as in Example 1 except that the type of polysiloxane employed in the preparation of the unvulcanized rubber composition was changed to those shown in Table 3 (i.e., PSiO-2 to PSiO-7 represented by the formula (8)). The evaluation of the charge uniformity, the evaluation of the image formation, the evaluation of the conductivity uniformity and the measurement of the crosslinking treatment depth were conducted in the same manner as in Example 1.

Examples 18 to 25

Electrophotographic members 18 to 25 were prepared in the same manner as in Example 1 except that the type of raw rubber and the content of the polysiloxane (DMS-V05) represented by the formula (7) employed in the preparation of the unvulcanized rubber composition were changed to those shown in Table 3. The evaluation of the charge uniformity, the evaluation of the image formation, the evaluation of the conductivity uniformity and the measurement of the crosslinking treatment depth were conducted in the same manner as in Example 1.

Example 26

Electrophotographic member 26 was prepared in the same manner as in Example 1 except that 0.3 part by mass each of both polysiloxanes represented by the formulas (7) and (8) (i.e., both DMS-V05 and PSiO-3) were used as the polysiloxane employed in the preparation of the unvulcanized rubber composition. The evaluation of the charge uniformity, the evaluation of the image formation, the evaluation of the conductivity uniformity and the measurement of the crosslinking treatment depth were conducted in the same manner as in Example 1.

Example 27

Electrophotographic member 27 was prepared in the same manner as in Example 1 except that the electron current employed as the electron rays treatment condition in the crosslinkage of the polymer having a butadiene skeleton and the polyorganosiloxane chain of Example 7 was changed to 5 mA. The evaluation of the charge uniformity, the evaluation of the image formation, the evaluation of the conductivity uniformity and the measurement of the crosslinking treatment depth were conducted in the same manner as in Example 1.

Example 28

Electrophotographic member 28 was prepared in the same manner as in Example 1 except that the type of polysiloxane represented by the formula (7) employed in the preparation of the unvulcanized rubber composition was changed to that shown in Table 3 (i.e., DMS-V35). The evaluation of the charge uniformity, the evaluation of the image formation, the evaluation of the conductivity uniformity and the measurement of the crosslinking treatment depth were conducted in the same manner as in Example 1.

Comparative Example 1

Electrophotographic member C1 was prepared in the same manner as in Example 1 except that the polysiloxane represented by the formula (7) was not used in the preparation of the unvulcanized rubber composition. The evaluation of the charge uniformity, the evaluation of the image formation, the evaluation of the conductivity uniformity and the measurement of the crosslinking treatment depth were conducted in the same manner as in Example 1.

Comparative Example 2

Electrophotographic member C2 was prepared in the same manner as in Example 1 except that polydimethylsiloxane (trade name: DMS-T63, manufactured by Gelest, Inc.) was used instead of the polysiloxane represented by the formula (7) in the preparation of the unvulcanized rubber composition. The evaluation of the charge uniformity, the evaluation of the image formation, the evaluation of the conductivity uniformity and the measurement of the crosslinking treatment depth were conducted in the same manner as in Example 1.

Comparative Example 3

Four materials shown in Table 6 were mixed first. On the other hand, a cylindrical conductive cored bar (of steel having a nickel-plated surface) with a diameter of 6 mm and a length of 252 mm was prepared, and an adhesive (trade name: DY35-051; manufactured by Dow Corning Toray Co., Ltd.) was applied on an axially center portion with a length of 226 mm of a cylindrical face of the cored bar, and the resultant was dried at 80° C. for 30 minutes.

The resulting conductive cored bar was placed in a center portion of a cylindrical mold, the aforementioned mixture of the materials was injected into the mold, and after thermally curing the mixture at a temperature of 130° C. for 20 minutes, the mold was taken off. Thereafter, the thus molded substance was further heated at a temperature of 200° C. for 2 hours in the air, so as to obtain a silicone rubber roller. Subsequently, the surface of the thus obtained conductive silicone rubber roller was ground with a plunge-cut grinding machine, so as to obtain electrophotographic member C3 having a diameter of 8.35 mm at each end and a diameter of 8.50 mm at the center. The evaluation of the charge uniformity, the evaluation of the image formation, the evaluation of the conductivity uniformity and the measurement of the crosslinking treatment depth were conducted in the same manner as in Example 1.

The results of the evaluations conducted in the aforementioned examples and comparative examples are shown in Tables 3 to 6.

The electrophotographic member of each example includes a resin layer in which the polymer having a butadiene skeleton was crosslinked at the both ends of polysiloxane, and the image failure derived from contamination is improved as compared with that caused in the comparative examples. The resin layer of the electrophotographic member of Comparative Example 1 does not include the binder resin of the present invention, and the resin layer of the electrophotographic member of Comparative Example 2 includes polysiloxane not crosslinked. In either of these comparative examples, the image failure derived from contamination is evaluated as a low rank. On the other hand, in each of the examples using the binder resin of the present invention including the crosslinked polysiloxane, the effect to suppress the adhesion of a toner or an external additive was confirmed. In Comparative Example 3 using silicone rubber as the binder resin, the conductivity uniformity was as high as 6.5, while the conductivity uniformity was 2.5 or less in each of the examples. Thus, an effect to attain uniform conductivity was confirmed in the system employed in the examples.

When the electrophotographic members of Examples 1 to 28 of the present invention were used, excellent images having no practical problem were obtained.

TABLE 3

| | | | Example 1 | Example 2 | Example 3 | Example 4 | Example 5 |
|---|---|---|---|---|---|---|---|
| Content (parts by mass) | Raw rubber | Nipol DN219 | 100 | 100 | — | — | — |
| | | Nipol 1507 | — | — | 100 | 100 | — |
| | | BR-1220L | — | — | — | — | 100 |
| | Zinc white | | 1 | 1 | 1 | 1 | 1 |
| | Zinc stearate | | 5 | 5 | 5 | 5 | 5 |
| | Super #2000 | | 20 | 20 | 20 | 20 | 20 |
| | Tokablack #7350SB | | 50 | 50 | 50 | 50 | 50 |
| | Polysiloxane of formula (7) | Type | DMS-V05 | DMS-V05 | DMS-V05 | DMS-V05 | DMS-V05 |
| | | content | 0.3 | 5.0 | 0.3 | 5.0 | 0.3 |
| | Polysiloxane of formula (8) | Type | — | — | — | — | — |
| | | content | — | — | — | — | — |
| | DMS-T63 | | — | — | — | — | — |
| | TBzTD | | 4.5 | 4.5 | 4.5 | 4.5 | 4.5 |
| | Sulfur | | 1.2 | 1.2 | 1.2 | 1.2 | 1.2 |
| | a + b | | 9 | 9 | 9 | 9 | 9 |
| | c + d | | — | — | — | — | — |
| | $R^1$-$R^4$ | | CH3— | CH3— | CH3— | CH3— | CH3— |
| | $R^7$-$R^{10}$ | | — | — | — | — | — |
| | $R^5$, $R^{12}$ | | — | — | — | — | — |
| | $R^6$, $R^{11}$ | | — | — | — | — | — |
| | Acceleration voltage (kV) | | 150 | 150 | 150 | 150 | 150 |
| | Irradiation current (mA) | | 35 | 35 | 35 | 35 | 35 |
| | Irradiation dose (kGy) | | 1323 | 1323 | 1323 | 1323 | 1323 |
| image failure | after making 6000 prints | | B | B | B | B | B |
| | after making 12000 prints | | B | B | C | C | C |
| | Charge uniformity | | A | A | A | A | A |
| | Conductivity uniformity | | 1.6 | 2.5 | 1.7 | 1.5 | 1.5 |
| | Crosslinking treatment depth (μm) | | 90 | 90 | 90 | 90 | 90 |

| | | | Example 6 | Example 7 | Example 8 | Example 9 | Example 10 |
|---|---|---|---|---|---|---|---|
| Content (parts by mass) | Raw rubber | Nipol DN219 | — | 100 | 100 | 100 | 100 |
| | | Nipol 1507 | — | — | — | — | — |
| | | BR-1220L | 100 | — | — | — | — |
| | Zinc white | | 1 | 1 | 1 | 1 | 1 |
| | Zinc stearate | | 5 | 5 | 5 | 5 | 5 |
| | Super #2000 | | 20 | 20 | 20 | 20 | 20 |
| | Tokablack #7350SB | | 50 | 50 | 50 | 50 | 50 |
| | Polysiloxane of formula (7) | Type | DMS-V05 | DMS-V21 | DMS-V21 | DMS-V52 | DMS-V52 |
| | | content | 5.0 | 0.3 | 5.0 | 0.3 | 5.0 |
| | Polysiloxane of formula (8) | Type | — | — | — | — | — |
| | | content | — | — | — | — | — |
| | DMS-T63 | | — | — | — | — | — |
| | TBzTD | | 4.5 | 4.5 | 4.5 | 4.5 | 4.5 |
| | Sulfur | | 1.2 | 1.2 | 1.2 | 1.2 | 1.2 |
| | a + b | | 9 | 80 | 80 | 2100 | 2100 |
| | c + d | | — | — | — | — | — |

TABLE 3-continued

|  |  | | | | | |
|---|---|---|---|---|---|---|
|  | $R^1$-$R^4$ | CH3— | CH3— | CH3— | CH3— | CH3— |
|  | $R^7$-$R^{10}$ | — | — | — | — | — |
|  | $R^5$, $R^{12}$ | — | — | — | — | — |
|  | $R^6$, $R^{11}$ | — | — | — | — | — |
|  | Acceleration voltage (kV) | 150 | 150 | 150 | 150 | 150 |
|  | Irradiation current (mA) | 35 | 35 | 35 | 35 | 35 |
|  | Irradiation dose (kGy) | 1323 | 1323 | 1323 | 1323 | 1323 |
| image | after making 6000 prints | B | A | A | A | A |
| failure | after making 12000 prints | C | A | A | A | A |
|  | Charge uniformity | A | A | A | A | A |
|  | Conductivity uniformity | 2.5 | 1.7 | 2.4 | 1.3 | 2.1 |
|  | Crosslinking treatment depth (μm) | 90 | 90 | 90 | 90 | 90 |

TABLE 4

|  |  |  | Example 11 | Example 12 | Example 13 | Example 14 | Example 15 |
|---|---|---|---|---|---|---|---|
| Content (parts by mass) | Raw rubber | Nipol DN219 | 100 | 100 | 100 | 100 | 100 |
|  |  | Nipol 1507 | — | — | — | — | — |
|  |  | BR-1220L | — | — | — | — | — |
|  | Zinc white | | 1 | 1 | 1 | 1 | 1 |
|  | Zinc stearate | | 5 | 5 | 5 | 5 | 5 |
|  | Super #2000 | | 20 | 20 | 20 | 20 | 20 |
|  | Tokablack #7350SB | | 50 | 50 | 50 | 50 | 50 |
|  | Polysiloxane of formula (7) | Type | PSiO-1 | — | — | — | — |
|  |  | Content | 0.3 | — | — | — | — |
|  | Polysiloxane of formula (8) | Type | — | PSiO-2 | PSiO-3 | PSiO-4 | PSiO-5 |
|  |  | Content | — | 0.3 | 0.3 | 0.3 | 0.3 |
|  | DMS-T63 | | — | — | — | — | — |
|  | TBzTD | | 4.5 | 4.5 | 4.5 | 4.5 | 4.5 |
|  | Sulfur | | 1.2 | 1.2 | 1.2 | 1.2 | 1.2 |
|  | a + b | | 2100 | — | — | — | — |
|  | c + d | | — | 2100 | 2100 | 2100 | 2100 |
|  | $R^1$-$R^4$ | | C10H21— | — | — | — | — |
|  | $R^7$-$R^{10}$ | | — | CH3— | CH3— | CH3— | CH3— |
|  | $R^5$, $R^{12}$ | | — | CH3— | CH3— | CH3— | H— |
|  | $R^6$, $R^{11}$ | | — | —CH2— | —C3H6— | —C4H8— | —C3H6— |
|  | Acceleration voltage (kV) | | 150 | 150 | 150 | 150 | 150 |
|  | Irradiation current (mA) | | 35 | 35 | 35 | 35 | 35 |
|  | Irradiation dose (kGy) | | 1323 | 1323 | 1323 | 1323 | 1323 |
| image | after making 6000 prints | | A | A | A | A | A |
| failure | after making 12000 prints | | A | A | A | A | A |
|  | Charge uniformity | | A | A | A | A | A |
|  | Conductivity uniformity | | 1.2 | 1.5 | 1.5 | 1.4 | 1.6 |
|  | Crosslinking treatment depth (μm) | | 90 | 90 | 90 | 90 | 90 |

|  |  |  | Example 16 | Example 17 | Example 18 | Example 19 | Example 20 |
|---|---|---|---|---|---|---|---|
| Content (parts by mass) | Raw rubber | Nipol DN219 | 100 | 100 | — | — | — |
|  |  | Nipol 1507 | — | — | 100 | 100 | 100 |
|  |  | BR-1220L | — | — | — | — | — |
|  | Zinc white | | 1 | 1 | 1 | 1 | 1 |
|  | Zinc stearate | | 5 | 5 | 5 | 5 | 5 |
|  | Super #2000 | | 20 | 20 | 20 | 20 | 20 |
|  | Tokablack #7350SB | | 50 | 50 | 50 | 50 | 50 |
|  | Polysiloxane of formula (7) | Type | — | — | DMS-V05 | DMS-V05 | DMS-V05 |
|  |  | Content | — | — | 0.3 | 5.0 | 0.3 |
|  | Polysiloxane of formula (8) | Type | PSiO-6 | PSiO-7 | — | — | — |
|  |  | Content | 0.3 | 0.3 | — | — | — |
|  | DMS-T63 | | — | — | — | — | — |
|  | TBzTD | | 4.5 | 4.5 | 4.5 | 4.5 | 4.5 |
|  | Sulfur | | 1.2 | 1.2 | 1.2 | 1.2 | 1.2 |
|  | a + b | | — | — | 9 | 9 | 9 |
|  | c + d | | 2100 | 2100 | — | — | — |
|  | $R^1$-$R^4$ | | — | — | CH3— | CH3— | CH3— |
|  | $R^7$-$R^{10}$ | | C10H21— | C10H21— | — | — | — |
|  | $R^5$, $R^{12}$ | | CH3— | H— | — | — | — |
|  | $R^6$, $R^{11}$ | | —C3H6— | —C3H6— | — | — | — |
|  | Acceleration voltage (kV) | | 150 | 150 | 150 | 150 | 150 |
|  | Irradiation current (mA) | | 35 | 35 | 35 | 35 | 35 |
|  | Irradiation dose (kGy) | | 1323 | 1323 | 1323 | 1323 | 1323 |

TABLE 4-continued

| | | | | | | |
|---|---|---|---|---|---|---|
| image | after making 6000 prints | A | A | A | A | A |
| failure | after making 12000 prints | A | A | B | B | B |
| | Charge uniformity | A | A | A | A | A |
| | Conductivity uniformity | 1.5 | 1.5 | 1.4 | 2.2 | 1.5 |
| | Crosslinking treatment depth (μm) | 90 | 90 | 90 | 90 | 90 |

TABLE 5

| | | | Example 21 | Example 22 | Example 23 | Example 24 | Example 25 |
|---|---|---|---|---|---|---|---|
| Content (parts by mass) | Raw rubber | Nipol DN219 | — | — | — | — | — |
| | | Nipol 1507 | 100 | — | — | — | — |
| | | BR-1220L | — | 100 | 100 | 100 | 100 |
| | Zinc white | | 1 | 1 | 1 | 1 | 1 |
| | Zinc stearate | | 5 | 5 | 5 | 5 | 5 |
| | Super #2000 | | 20 | 20 | 20 | 20 | 20 |
| | Tokablack #7350SB | | 50 | 50 | 50 | 50 | 50 |
| | Polysiloxane of formula (7) | Type | DMS-V05 | DMS-V05 | DMS-V05 | DMS-V05 | DMS-V05 |
| | | Content | 5.0 | 0.3 | 5.0 | 0.3 | 5.0 |
| | Polysiloxane of formula (8) | Type | — | — | — | — | — |
| | | Content | — | — | — | — | — |
| | DMS-T63 | | — | — | — | — | — |
| | TBzTD | | 4.5 | 4.5 | 4.5 | 4.5 | 4.5 |
| | Sulfur | | 1.2 | 1.2 | 1.2 | 1.2 | 1.2 |
| | a + b | | 9 | 9 | 9 | 9 | 9 |
| | c + d | | — | — | — | — | — |
| | $R^1$-$R^4$ | | CH3— | CH3— | CH3— | CH3— | CH3— |
| | $R^7$-$R^{10}$ | | — | — | — | — | — |
| | $R^5$, $R^{12}$ | | — | — | — | — | — |
| | $R^6$, $R^{11}$ | | — | — | — | — | — |
| | Acceleration voltage (kV) | | 150 | 150 | 150 | 150 | 150 |
| | Irradiation current (mA) | | 35 | 35 | 35 | 35 | 35 |
| | Irradiation dose (kGy) | | 1323 | 1323 | 1323 | 1323 | 1323 |
| image failure | after making 6000 prints | | A | A | A | A | A |
| | after making 12000 prints | | B | B | B | B | B |
| | Charge uniformity | | A | A | A | A | A |
| | Conductivity uniformity | | 2 | 1.7 | 2 | 1.5 | 2.1 |
| | Crosslinking treatment depth (μm) | | 90 | 90 | 90 | 90 | 90 |

| | | | Example 26 | Example 27 | Example 28 | Comparative Example 1 | Comparative Example 2 |
|---|---|---|---|---|---|---|---|
| Content (parts by mass) | Raw rubber | Nipol DN219 | 100 | 100 | 100 | 100 | 100 |
| | | Nipol 1507 | — | — | — | — | — |
| | | BR-1220L | — | — | — | — | — |
| | Zinc white | | 1 | 1 | 1 | 1 | 1 |
| | Zinc stearate | | 5 | 5 | 5 | 5 | 5 |
| | Super #2000 | | 20 | 20 | 20 | 20 | 20 |
| | Tokablack #7350SB | | 50 | 50 | 50 | 50 | 50 |
| | Polysiloxane of formula (7) | Type | DMS-V05 | DMS-V05 | DMS-V35 | — | — |
| | | Content | 0.3 | 0.3 | 0.3 | — | — |
| | Polysiloxane of formula (8) | Type | PSiO-3 | — | — | — | — |
| | | Content | 0.3 | — | — | — | — |
| | DMS-T63 | | — | — | — | — | 0.3 |
| | TBzTD | | 4.5 | 4.5 | 4.5 | 4.5 | 4.5 |
| | Sulfur | | 1.2 | 1.2 | 1.2 | 1.2 | 1.2 |
| | a + b | | 9 | 9 | 770 | — | — |
| | c + d | | 2100 | — | — | — | — |
| | $R^1$-$R^4$ | | — | CH3— | CH3— | — | — |
| | $R^7$-$R^{10}$ | | CH3— | — | — | — | — |
| | $R^5$, $R^{12}$ | | CH3— | — | — | — | — |
| | $R^6$, $R^{11}$ | | —C3H6— | — | — | — | — |
| | Acceleration voltage (kV) | | 150 | 150 | 150 | 150 | 150 |
| | Irradiation current (mA) | | 35 | 5 | 35 | 35 | 35 |
| | Irradiation dose (kGy) | | 1323 | 189 | 1323 | 1323 | 1323 |
| image failure | after making 6000 prints | | A | A | A | D | D |
| | after making 12000 prints | | A | 13 | A | D | D |
| | Charge uniformity | | A | A | A | A | A |
| | Conductivity uniformity | | 2.5 | 1.7 | 1.3 | 2.7 | 2.8 |
| | Crosslinking treatment depth (μm) | | 90 | 40 | 90 | 30 | 30 |

TABLE 6

|  |  | Comparative Example 3 |
|---|---|---|
| Content (parts by mass) | Liquid silicone rubber material (trade name: SE6724A/B, manufactured by Dow Corning Toray Co., Ltd.) | 100 |
|  | Carbon black (trade name: Tokablack #7360SB, manufactured by Tokai Carbon Co., Ltd.) | 350 |
|  | Ground quartz (trade name: Min-USil, manufactured by Pennsylvania Glass Sand Co.) | 4 |
|  | Platinum catalyst (trade name: SIP6830.3, manufactured by Gelest, Inc.) | 0.5 |
| Image failure | after making 6000 prints | B |
|  | after making 12000 prints | D |
|  | Charge uniformity | B |
|  | Conductivity uniformity | 6.5 |
|  | Crosslinking treatment depth (μm) | 0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289331, filed Dec. 28, 2011, which is hereby incorporated by reference herein in its entirety.

What is claimed is:

1. An electrophotographic member comprising:
   an electrically conductive substrate; and
   an electrically conductive resin layer as a surface layer, wherein:
   the resin layer comprises electrically conductive particles and a binder resin, and
   the binder resin is a polymer in which a polymer chain having at least one unit selected from the group consisting of units represented by the following formulas (1) and (2), and at least one unit selected from the group consisting of units represented by the following formulas (3) and (4), is crosslinked by at least one organopolysiloxane chain selected from the group consisting of structures represented by the following formulas (5) and (6):

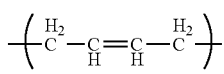
(Formula 1)

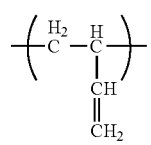
(Formula 2)

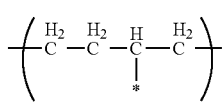
(Formula 3)

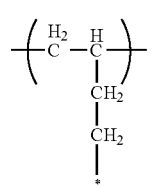
(Formula 4)

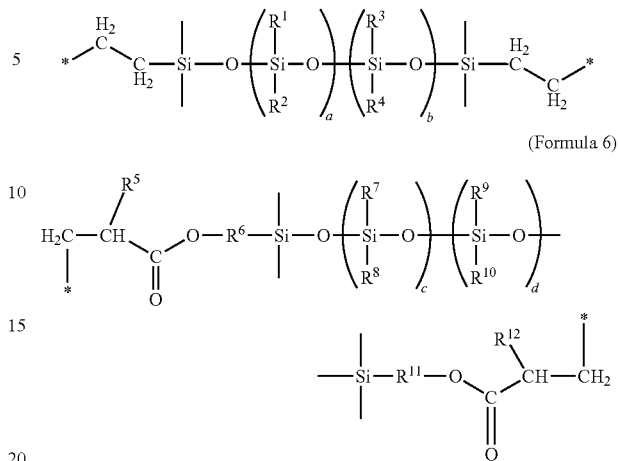
(Formula 5)

(Formula 6)

wherein in the formula (5), $R^1$ to $R^4$ each independently represent an alkyl group having a carbon number of 1 to 10, a and b each independently represent an integer of 0, or 1 or more, and a+b is an integer of 1 or more;

in the formula (6), $R^7$ to $R^{10}$ each independently represent an alkyl group having a carbon number of 1 to 10, $R^5$ and $R^{12}$ each independently represent a hydrogen atom or a methyl group, $R^6$ and $R^{11}$ each independently represent an alkylene group having a carbon number of 1 to 4, c and d each independently represent an integer of 0, or 1 or more, and c+d is an integer of 1 or more; and a sign "*" of the formula (3) and the formula (4) represents a binding site with a sign "*" of the formula (5) or the formula (6).

2. The electrophotographic member according to claim 1, wherein the binder resin has an organopolysiloxane chain represented by the formula (5), and a sum of a and b of the formula (5) is 80 or more and 2100 or less.

3. The electrophotographic member according to claim 1, wherein the binder resin has an organopolysiloxane chain represented by the formula (6), and a sum of c and d of the formula (6) is 80 or more and 2100 or less.

4. A process cartridge having a structure removable from a main body of an electrophotographic apparatus, comprising an electrophotographic member according to claim 1.

5. An electrophotographic apparatus comprising an electrophotographic member according to claim 1.

6. A method for producing an electrophotographic member according to claim 1, comprising the steps of:
   (1) forming, on an electrically conductive substrate, a layer of a rubber composition comprising a polymer having a butadiene skeleton, at least one organopolysiloxane compound selected from the group consisting of compounds represented by the following formulas (7) and (8), and electrically conductive particles; and
   (2) irradiating a surface of the layer of the rubber composition with an electron rays, and thereby crosslinking the rubber composition in a surface portion of the layer of a rubber composition, and forming an electrically conductive resin layer:

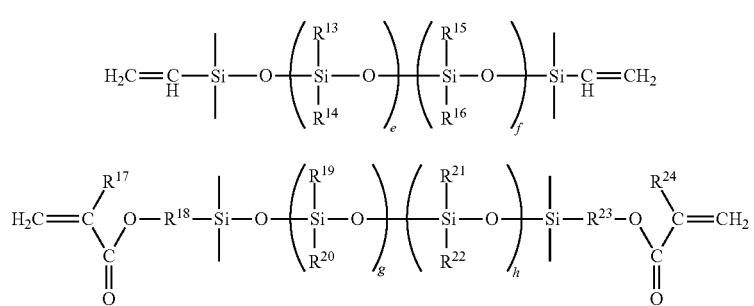

Formula (7)

Formula (8)

wherein in the formula (7), $R^{13}$ to $R^{16}$ each independently represent an alkyl group having a carbon number of 1 to 10, e and f each independently represent an integer of 0, or 1 or more and e+f is an integer of 1 or more; and in the formula (8), $R^{19}$ to $R^{22}$ each independently represent an alkyl group having a carbon number of 1 to 10, $R^{17}$ and $R^{24}$ each independently represent a hydrogen atom or a methyl group, $R^{19}$ and $R^{23}$ each independently represent an alkylene group having a carbon number of 1 to 4, g and h each independently represent an integer of 0, or 1 or more, and g+h is an integer of 1 or more.

* * * * *